Feb. 22, 1927.
T. W. VARLEY
1,618,495
SWITCH CONSTRUCTION
Original Filed Oct. 15, 1920
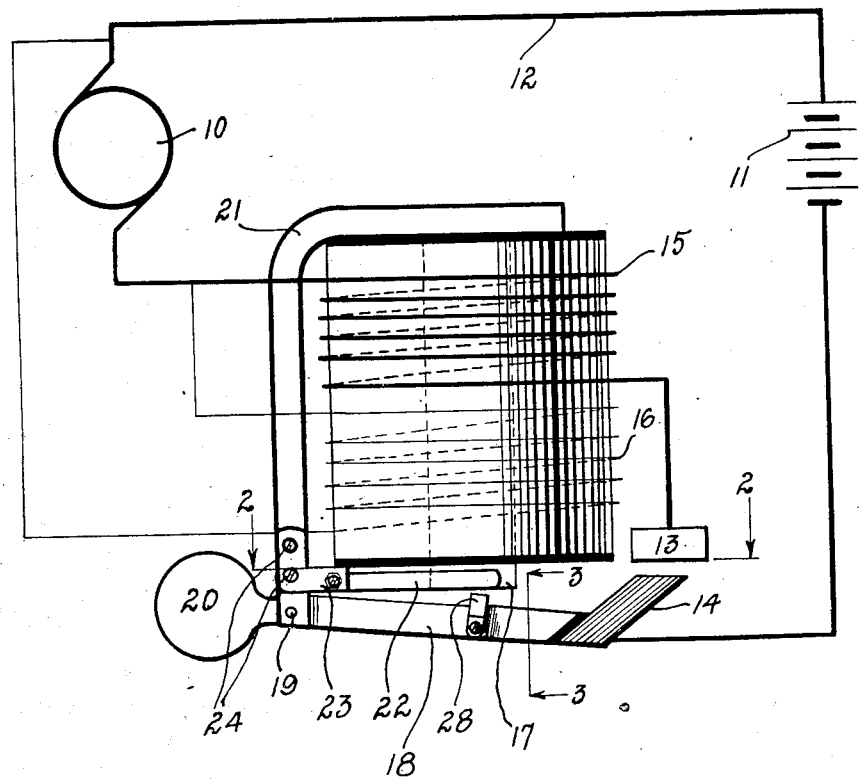
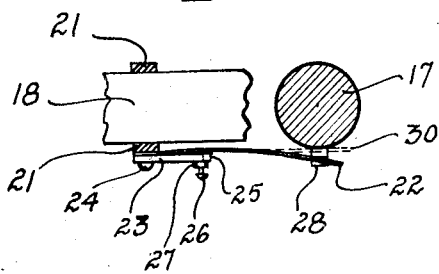
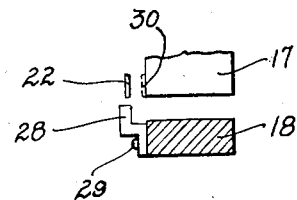
INVENTOR
Thomas W. Varley
BY
Robert L. Blair
ATTORNEY Patented Feb. 22, 1927.

1,618,495

UNITED STATES PATENT OFFICE.

THOMAS W. VARLEY, OF NEW YORK, N. Y., ASSIGNOR TO THE SAFETY CAR HEATING & LIGHTING COMPANY, A CORPORATION OF NEW JERSEY.

SWITCH CONSTRUCTION.

Original application filed October 15, 1920, Serial No. 417,130. Divided and this application filed September 28, 1923. Serial No. 665,274.

This invention relates to switch construction and more particularly to such construction in connection with apparatus for charging storage batteries from an intermittently actuated generator. One of the objects thereof is to provide practical apparatus of the above type for preventing accidental closing of an electric switch. Another object is to provide apparatus of the above type of simple and inexpensive construction and efficient action. Another object is to provide simple and automatic mechanism for governing the actuation of a magnetically controlled part. Other objects will be in part obvious and in part pointed out hereinafter.

This application is a division of my application Serial No. 417,130, filed October 15, 1920, for switch construction.

The invention accordingly consists in the features of construction, combinations of elements and arrangement of parts which will be exemplified in the structure hereinafter described and the scope of the application of which will be indicated in the following claims.

In the accompanying drawings in which is shown one of various possible embodiments of this invention, Figure 1 is a diagrammatic view of the apparatus showing certain of the more active parts in side elevation;

Figure 2 is a sectional plan along the line 2—2 of Figure 1; and

Figure 3 is a sectional elevation along the line 3—3 of Figure 1.

Similar reference characters refer to similar parts throughout the several views of the drawings.

Referring now to Figure 1 of the drawings in detail, there is shown at 10 a generator which may be of the axle driven car lighting type. At 11 is a storage battery, one pole of which is connected with the generator by means of the conductor 12. The remaining pole of the battery is connected both through the switch contacts 13 and 14 and a series coil 15 on the remaining pole of the generator. This series coil is mounted on an automatic switch which comprises also the compoundly wound voltage coil 16 connected across the generator. The aggregate field of these coils magnetizes the core 17 while the contacts are closed, and prior to the closing of the contacts, the magnet is energized by coil 16. The latter accordingly, upon attaining sufficient strength, swings the contact 14 into engagement with the contact 13 against any desired type of retracting force, the contact 14 being mounted on a suitable lever 18 pivoted at 19 and counterweighted at 20 to bring its axis substantially at the center of gravity of the moving parts.

The magnetic circuit is closed through the core 17 by means of a suitable yoke 21 to which the lever 18 is pivoted.

In apparatus of this type, assuming the generator to be inactive as during the stoppage of a train, there is a likelihood of the switch being accidentally closed either manually or by other means. Such closure would cause the battery to discharge back through the generator with a tendency to injurious result.

To overcome the latter defect and achieve other advantages, there is mounted upon the yoke 21 a flat spring 22 which is held in place at its end by a plate 23 secured to the block as by screws 24. This plate extends outwardly in the direction of the spring at 25 and is provided with a set screw 26 and lock nut 27 by which the normal position of the spring may be adjusted by flatwise bending.

The free end of spring 22 extends opposite the pole piece or core 17 as shown in the drawings and is normally spaced therefrom as shown in full lines. With this position of the parts the spring is edgewise in the path of a stop 28 which is secured as at 29 to the lever 18. With the parts thus positioned the spring would engage the stop 28 edgewise upon a tendency of the arm or lever to swing upwardly and prevent it from moving into contact-making position.

When however the core 17 is magnetized to a sufficient degree thus indicating that the generator is running at such speed as to render the closing of the switch harmless, the attraction of the core upon the free end of the steel spring 22 swings the latter into the position indicated at 30 in dotted lines in Figures 2 and 3 of the drawings, in which it rests against the pole piece and is moved out of the path of the stop 28. With the parts thus positioned, the switch member, upon the core 17 attaining sufficient magnetic strength, is thrown into circuit-completing position and the battery may be charged. When however the generator is slowed down or for other reason the magnetic strength of the core 17 falls to such a value that a closed position of the switch is harmful, the switch will have fallen open and the spring 22 automatically moved out of its full line position, thus locking the parts against accidental actuation.

It may here be noted that the term "locking" is used in a broad sense to comprehend a frictional action if such action be of a degree to perform the functions in view.

It will thus be seen that there is provided apparatus in which the several objects of this invention are achieved and that the same is of simple construction and yet dependable action. It may be adjusted, moreover, by the means hereinbefore set forth to meet various desired conditions of use, and the parts are readily accessible and unaffected by long-continued action.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:—

1. In apparatus of the class described, in combination, an electromagnet coil, a stationary core passing through said coil, a metal yoke connected to said core at one end thereof, passing therefrom exterior of said coil and terminating at a point adjacent the other end of said core, a switch member pivoted upon said yoke adjacent said termination thereof and positioned to be attracted by and swung toward said last end of said core and to circuit-closing position upon energization of said coil, and a member mounted upon said yoke adjacent the pivot of said switch member thereon and projecting therefrom toward said last end of said core, said member normally tending to spring into the path of movement of said switch member to prevent closing thereof and being adapted to be attracted by said core upon energization of said coil and be drawn thereby out of the path of movement of said switch member.

2. In apparatus of the class described, in combination, an electromagnet coil, a stationary core passing through said coil and projecting from the lower end thereof, a metal yoke connected to said core at the upper end thereof and passing therefrom downwardly exterior of said coil and terminating at a point adjacent said projecting lower end of said core, a switch member pivoted upon said yoke adjacent said termination thereof and projecting beneath said lower end of said core adapted upon energization of said coil to be attracted by said core and swung upwardly toward the same to circuit-closing position, and a member mounted upon said yoke adjacent the pivot of said switch member thereon and projecting therefrom along the side of said projecting end portion of said core, said member normally tending to spring into the path of movement of said switch member to prevent closing thereof and being adapted upon energization of said coil to be attracted and moved laterally by said core out of the path of movement of said switch.

3. In apparatus of the class described, in combination, a metal core, a voltage coil thereabout, a current coil thereabout, a metal yoke connected to one end of said core, passing therefrom exterior of said coils and terminating adjacent the other end of said core, a switch member pivoted upon said yoke adjacent said termination thereof and extending adjacent said last end of said core, said switch member being adapted upon energization of said voltage coil to be attracted by said core and swung thereby to circuit-closing position, said switch member being adapted upon circuit-closing movement to close the circuit of said current coil, and a member mounted upon said yoke adjacent the pivot of said switch member thereon and projecting therefrom toward said last end of said core, said member normally tending to spring into the path of movement of said switch member to prevent closing thereof and being adapted to be attracted by said core upon energization of said voltage coil and be drawn thereby out of the path of movement of said switch member.

In testimony whereof, I have signed my name to this specification this 20th day of September, 1923.

THOMAS W. VARLEY.